United States Patent [19]

Matsuda et al.

[11] Patent Number: 4,890,683

[45] Date of Patent: Jan. 2, 1990

[54] POWER STEERING APPARATUS

[75] Inventors: Akinobu Matsuda; Masamitsu Sakai, both of Osaka, Japan

[73] Assignee: Koyo Seiko Co., Ltd., Osaka, Japan

[21] Appl. No.: 182,124

[22] Filed: Apr. 15, 1988

[30] Foreign Application Priority Data

Oct. 20, 1987 [JP] Japan .................. 62-266027

[51] Int. Cl.⁴ .................. B62D 5/04
[52] U.S. Cl. .................. 180/79.1; 74/422; 74/498; 180/147
[58] Field of Search .................. 180/79.1, 141, 142, 180/146, 147; 74/498, 500, 412 R, 412 TA, 422

[56] References Cited

U.S. PATENT DOCUMENTS

| | | | |
|---|---|---|---|
| 4,133,221 | 1/1979 | Clary | 74/498 |
| 4,681,182 | 7/1987 | Suzuki | 180/79.1 |
| 4,778,021 | 10/1988 | Morishita et al. | 180/79.1 |

FOREIGN PATENT DOCUMENTS

| | | | |
|---|---|---|---|
| 2845864 | 5/1979 | Fed. Rep. of Germany | 180/79.1 |
| 37580 | 2/1986 | Japan | 180/79.1 |
| 41670 | 2/1986 | Japan | 180/79.1 |
| 226362 | 10/1986 | Japan | 180/79.1 |
| 2164906 | 12/1987 | United Kingdom . | |
| 2169567 | 3/1988 | United Kingdom . | |
| 2175551 | 6/1988 | United Kingdom . | |

*Primary Examiner*—Mitchel J. Hill
*Attorney, Agent, or Firm*—Oltsch, Knoblock & Hall

[57] ABSTRACT

A power steering apparatus in which a housing to contain a torque sensor for sensing seering torque, a small-sized motor for assisting steering, and a driving device for transmitting driving force of the motor to the steering shaft is made small-sized and disposed on the middle part of the steering shaft in the cab of the car, and, further, pressure angles of rack teeth engaging with a pinion shaft connected to the steering shaft reduce with the advance from the center of the toothed part of the rack to the end thereof so that steering assisting power is increased with the increase in the degree of steering angle.

2 Claims, 7 Drawing Sheets

POWER STEERING APPARATUS

BACKGROUND OF THE INVENTION

1. Field of the Invention

This invention relates generally to a power steering apparatus which increases steering power with the assistance of an electric motor and, in particular, to a power steering apparatus provided with a compact driving device comprising a small-sized motor so as to increase steering-assisting power in proportion to increase in steering angle.

2. Prior Art

There has been developed an electric power steering apparatus in which a motor for increasing steering-assisting power is driven on the basis of result of sensing steering torque exerted on the steering wheel and power required for operating the steering wheel is intensified by rotational power of the abovesaid motor for making the driver to feel comfortable in steering.

In the automobile equipped with a rack-pinion type steering mechanism composed of a steering shaft having a steering wheel fitted on one end thereof, a pinion shaft connected to the other end of the steering shaft through universal joints, and a rack shaft in the gearing relation with the pinion shaft and extending across the care body so that steering is performed by converting the rotation of the pinion shaft caused by the turning operation of the steering wheel into the axial displacement of the rack shaft, the aforesaid power steering apparatus is in such structure that the pinion shaft is divided into an input shaft connected to the steering shaft and an output shaft connected to the rack shaft, and a torsion bar is interposed between these two shafts for connecting them together on the same axial line, for example, a structure comprising a potentiometer which outputs electric potential corresponding to relative positions of both shafts along the circumferential directions thereof for sensing steering torque exerted on the steering wheel while depending on variation in potential outputted from the potentiometer as relative displacement between the input shaft and output one caused by torsion in the torsion bar corresponding to steering torque, and a steering-assisting motor arranged for driving rotational power thereof through an appropriate reduction gear device to the output side of the abovesaid pinion shaft or another pinion shaft being in gearing engagement with the rack shaft at a position along the axial direction different from that of the aforesaid pinion shaft.

The conventional power steering apparatus of such structure as above is followed by disadvantages that, because of both the torque sensor comprising the potentiometer and the steering-assisting motor disposed near the pinion shaft and rack shaft which are positioned low in the engine room having less spare space, a hard work in a limited space is inevitable in repairing or adjusting when any trouble is caused in the torque sensor or motor and, in addition, comparatively large sizes of the motor and reduction gear device possibly make it difficult to obtain setting positions thereof, particularly, in the case of the minicar.

Power required for steering the car varies according to the running speed of the car, increasing to a comparatively high degree during low speed running whereas decreasing to a slight degree during high speed running. Accordingly, a steering-assisting motor capable of enough reducing steering power during low speed running and halt of the car, when used in such power steering apparatus as above, is obliged to be large-sized, makes arrangement thereof more difficult, and causes excessive steering-assisting power during high speed running, whereby the steering wheel vibrates even with a slight degree of force applied thereto and possibly reduces stability in straightforward driving. Such disadvantages can be eliminated by providing a structure to control driving electric current of the motor and to vary rotational power of the motor according to the driving speed of the car or the turning angle of the steering wheel, or using a motor of small capacity in consideration of an appropriate stiffness to be endowed to the steering wheel during high speed running, however, in the former case, the structure is complicated at a control part and possibly increases frequency of trouble occurrence as well as, in the latter case, satisfactory steering-assisting power cannot be obtained at the time of halt and low speed driving, thereby requiring a large degree of force for steering operation.

SUMMARY OF THE INVENTION

This invention has been initiated for solving problems in the prior art as described above and a first object thereof is to provide a power steering apparatus in which a gear ratio between the rack and pinion of the rack-pinion type steering is made variable and the use of a motor of small capacity ensures sufficient steering-assisting power during low speed running or halt and appropriate stiffness to be endowed to the steering wheel during high speed running.

A second object of this invention is to provide a power steering apparatus which permits miniaturization of a steering-assisting motor and releases the setting position of the motor from restriction.

A third object of this invention is to provide a power steering apparatus which permits miniaturization of the steering-assisting motor and torque sensor so that maintenance operation thereof may be easy when installed in the cab.

The above and further objects and features of the invention will more fully be apparent from the following detailed description with accompanying drawings.

DETAILED DESCRIPTION OF THE PREFERRED EMBODIMENTS

Figure 1:
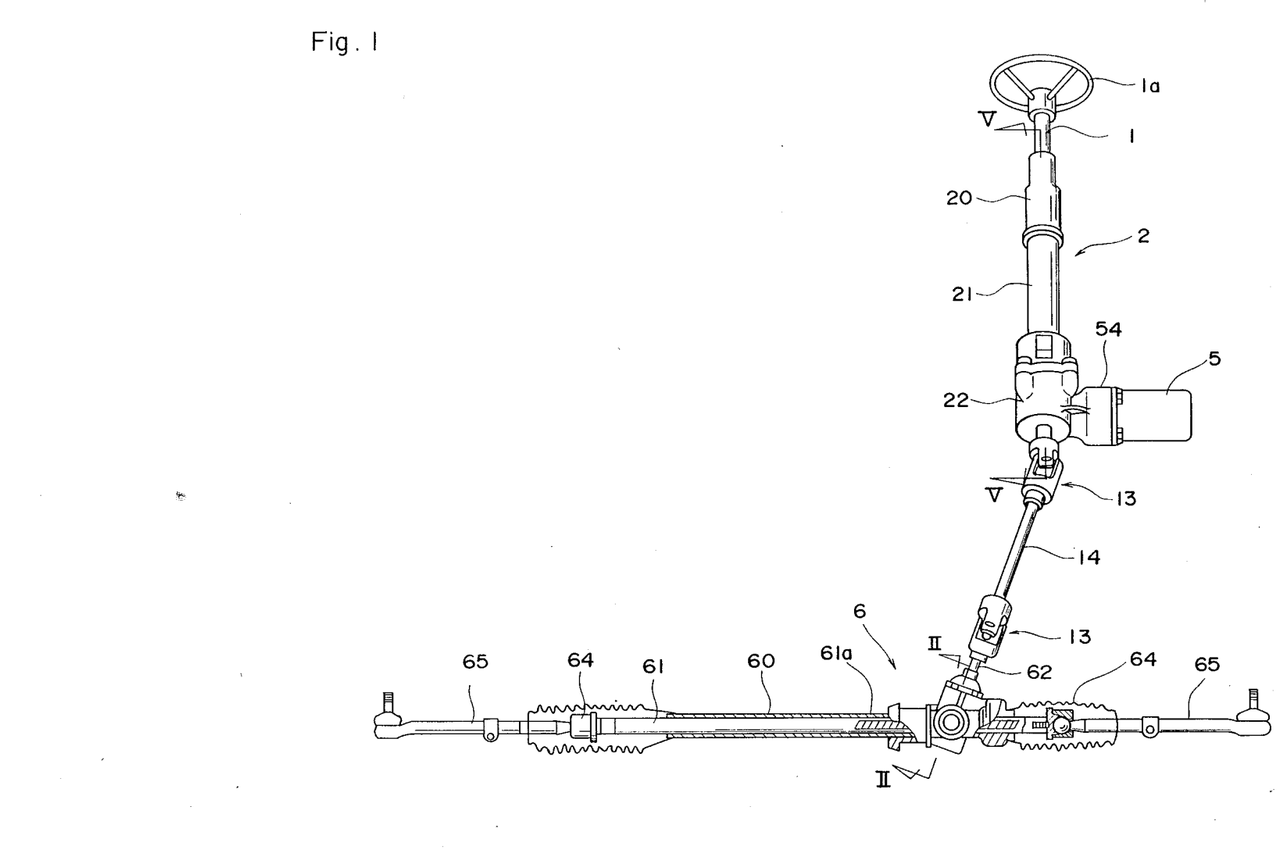
FIG. 1 is a schematic front view of a power steering apparatus according to this invention.

This invention will be described with reference to the drawings showing the embodiments thereof. FIG. 1 is partially broken front view of the whole of the structure of a power steering apparatus of this invention.

In this drawing, the numeral 1 indicates a steering shaft fixed to an appropriate place in the cab with the bottom thereof directed forward so as to slant as a whole and supported by and within a cylindrical housing 2 rotatably and coaxially therewith, a steering wheel 1a being fixedly fitted on and coaxially with the top end of the steering shaft 1 projecting in an appropriate length from the upper part of the housing 2. A torque sensor 4 (see FIG. 5) is formed outside the lower part of the steering shaft 1 as will be described later and cotained in the housing 2. Further, a steering-assisting motor 5 is fixed to the lower outer part of the housing 2 in such manner that the axial center of the motor intersects the housing at an approximate right angle and rotational power of the motor 5 is driven to the steering shaft 1 in the housing 2.

The numeral 6 shown in FIG. 1 indicates a motion-converting mechanism composed of: a cylindrical rack shaft case 60 extending long in the crosswise direction of the car body and disposed roughly horizontally in the engine room occupying the front part of the car body; a rack shaft 61 inserted into the rack shaft case 60 coaxially therewith and axially displaceably, and pinion shaft 62 adapted in the rack shaft case 60 to obliquely intersect the rack shaft 61 at axial center thereof, and engaged with the rack shaft 61 as will be described later.

Figure 2:
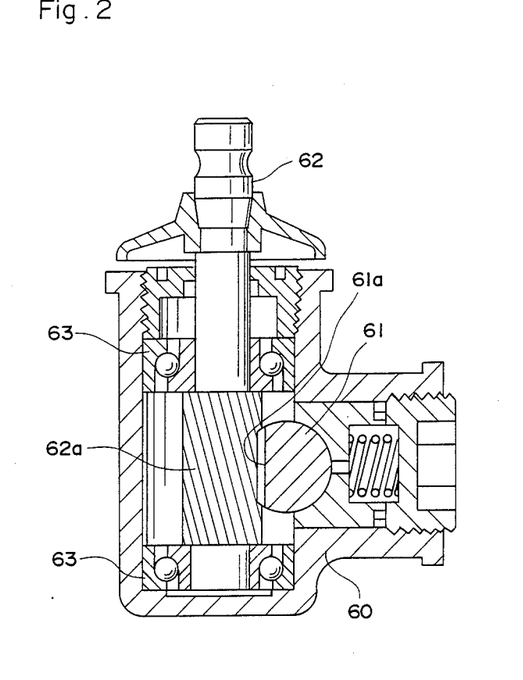
FIG. 2 is an enlarged sectional view thereof taken from the line II—II shown in FIG. 1.

FIG. 2 is an enlarged sectional view taken from the line II—II shown in FIG. 1 for showing the rack shaft 61 and the pinion shaft 62 in mesh. The rack shaft 61 is provided with a flat part extending in an appropriate axial length near one end thereof and the flat part is provided with rack teeth 61a almost throughout the length thereof. The pinion shaft 62 is provided with pinion teeth 62a formed on the periphery of the middle part thereof, supported at both sides of the part having pinion teeth 62a by respective ball bearings 63, 63, further supported at the rack shaft case 60 in the abovesaid manner, and in the case 60, engaged with the rack shaft 61 with the rack teeth 61a meshed with the pinion teeth 62a.

The upper end of the pinion shaft 62 projecting in an appropriate length above the rack shaft case 60 is connected to the lower end of the steering shaft 1 projecting in an appropriate length from the lower part of the housing 2 through an intermediate shaft 14 provided with a pair of universal joints 13, 13 at both ends respectively, whereby the pinion shaft 62 rotates with the rotation of the steering shaft 1, the rotation of the pinion shaft 62 being converted into axial displacement of the rack shaft 61 by engagement of the pinion teeth 62a with the rack teeth 61a. Both ends of the rack shaft 61 projecting from both sides of the rack shaft case 60 are connected, through respective ball joints 64, 64 and tie rods 65, 65, to the knuckle arms which are not shown in the drawing but bearingly support the right and left front wheels and rotate on a horizontal plane respectively, whereby the front wheels are steered right and left correspondingly to the axial displacement of the rack shaft 61, that is, the transverse displacement of the car body.

Figure 3:
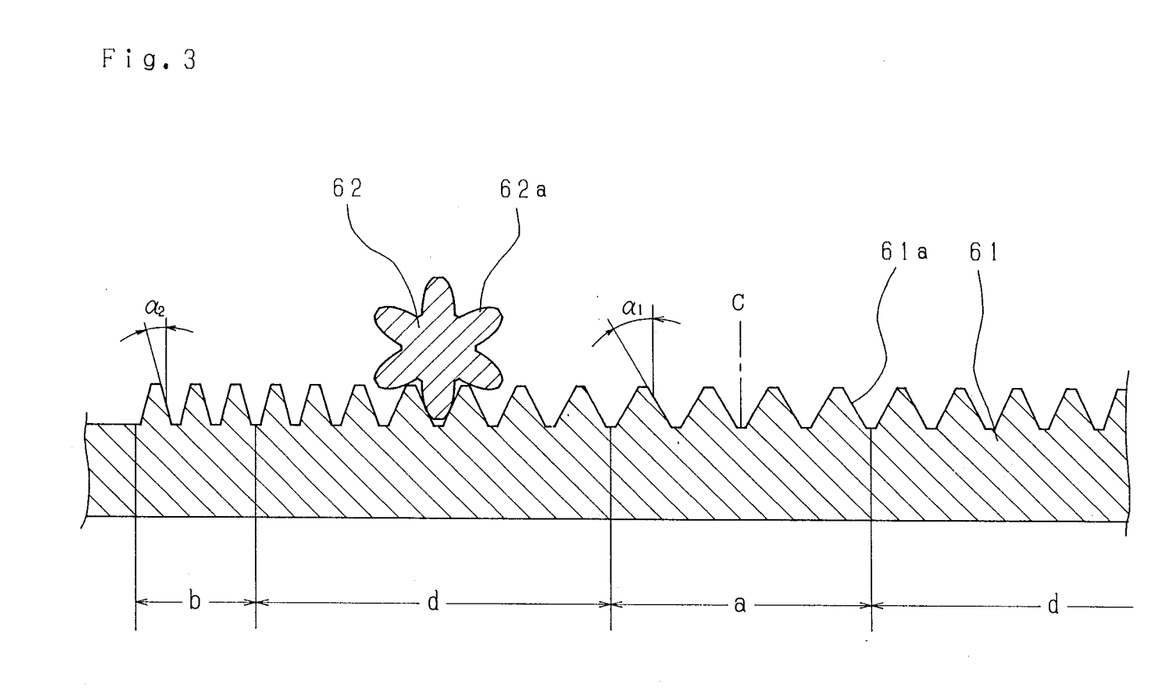
FIG. 3 is a schematic sectional view of the rack and pinion in mesh.

FIG. 3 is an enlarged sectional view showing the rack teeth 61a meshing with the pinion teeth 62a, in which the rack teeth 61a are formed, as shown in the drawing, to possess pressure angles at parts thereof meshing with the pinion teeth 62a in such manner that the pressure angles are $\alpha_1$ within the zone a extending in a fixed axial length with the center point C positioned in the exact midpoint of the toothed part and $\alpha_2$ smaller than $\alpha_1$ within the zones b extending from both ends of the toothed part whereas the other angles within the zones d each extending between a and b reduce stepwise from $\alpha_1$ to $\alpha_2$, respectively. Rack teeth 61a of such kind have been disclosed in the U.S. Pat. No. 3,267,763. An initial position of the rack shaft 61 along the displacement direction when the right and left front wheels connected to the rack shaft 61 as above are in the state of the straightforward movement is set so that the rack shaft 61 may be engaged with the pinion shaft 62 at the abovesaid center point C.

Figure 4:
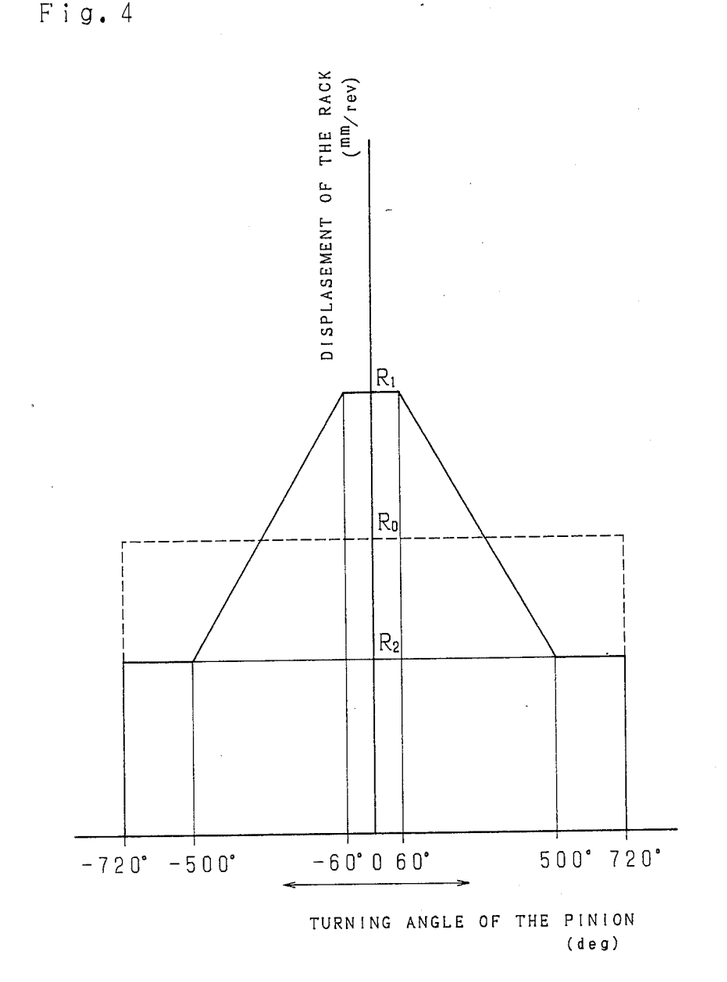
FIG. 4 is a graph showing the relation between the degree of turning angle of the pinion shaft and the displacement of the rack.

FIG. 4 is a graph showing the relation between the displacement of the rack shaft 61 and the degree of turning angle of the pinion shaft 62, in which the abscissa indicates that the turning angle $\theta(°)$ of the pinion shaft 62 is assumed to be 0 (zero) when the front wheels are in the state of straightforward movement and to be positive or negative when the front wheels are steered leftward or rightward, respectively, whereas the ordinate indicates a displacement R (mm/Rev) of the rack shaft 61 per revolution of the pinion shaft 62. Because of the rack teeth 61a being formed in the abovesaid manner, a displacement R of the rack shaft 61 per revolution of the pinion shaft 62 is kept at a fixed large value $R_1$ within the turning range ($-60° \sim +60°$) of the pinion shaft 62 in which the pinion teeth 62a mesh with the rack teeth 61a in the zone a whereas kept at a fixed small value $R_2$ within the turning range ($500° \sim 720°$ and $-500° \sim -720°$) of the pinion shaft 62 in which the pinion teeth 62a mesh with the rack teeth 61a in the zone b. When a degree of turning angle of the pinion shaft 62a falls within the above two kinds of turning ranges, the pinion teeth 62a mesh with the rack teeth 61a in the zone d and, therefore, the displacement R decreases with the increase in the absolute value of the degree of turning angle of the pinion shaft 62 within the range from $R_1$ to $R_2$. A fixed value $R_0$ shown by the broken line in FIG. 4 represents a displacement of the rack shaft 61 per revolution of the pinion shaft 62 employed in the case of ordinary manual steering, and the pressure angles $\alpha_1$ and $\alpha_2$ of the rack teeth 61a are preset so that the abovesaid values $R_1$ and $R_2$ may be larger and smaller than $R_0$, respectively.

Figure 5:
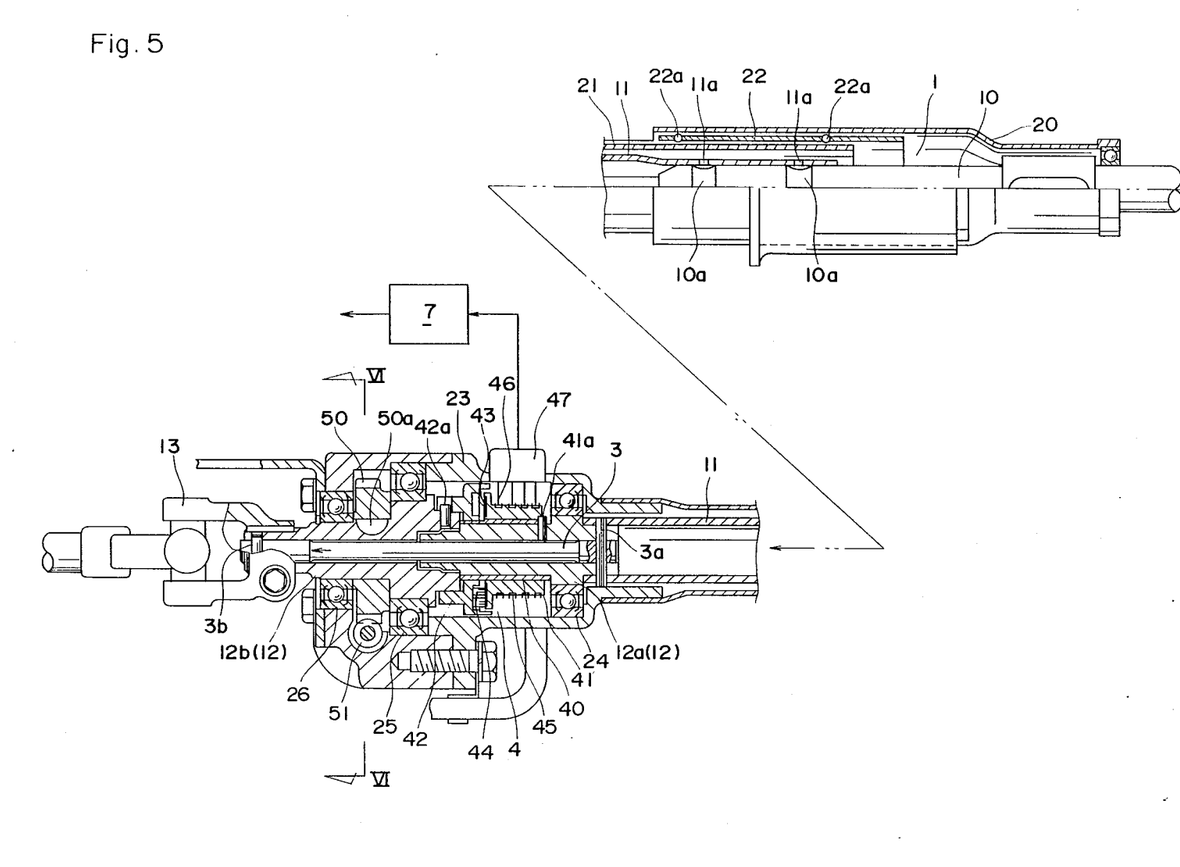
FIG. 5 is an enlarged sectional view taken from the line V—V shown in FIG. 1 for showing the internal structure of a housing.

FIG. 5 is an enlarged sectional view of the inner structure of the housing 2 taken from the line V—V shown in FIG. 1. The shaft system comprising the steering shaft 1 and housing 2 shown in this drawing is provided with a socalled "safe steering wheel" structure which, for protecting the driver from being possibly wounded in case of collision accident, absorbs excessive impact acting upon the steering wheel 1 in the axial direction, and the steering shaft 1 comprises an upper shaft 10 to which the steering wheel 1a is fixed at the upper end thereof, a lower shaft 12 whose bottom part is connected to the aforesaid motion-converting mechanism 6, and a cylindrical connecting member 11 whose both ends are fitted onto the upper end of the lower shaft and the lower end of the upper shaft 10 respectively so as to connect the upper and lower shafts to each other on the same axial line. The lower part of the upper shaft 10 is rectangular at cross section and two annular grooves 10a, 10a are formed on the periphery thereof at an appropriate length in the axial direction. The upper part of the connecting member 11 is shaped to be rectangular at cross section for conforming to the cross section of the lower part of the upper shaft 10, and a plurality of round holes 11a, radially piercing through the connecting member 11 are provided for this cross-sectionally rectangular part at respective two points spaced from each other, in the axial direction at a distance approximately equal to the distance between the two annular groove 10a, 10a. The connecting member 11 is fitted on the upper shaft 10 in axial depth required for positional conformity of the round holes 11a, 11a to the annular grooves 10a, 10a and connected thereto with resin poured from the round holes 11a, 11a into the annular grooves 10a, 10a and then solidified. The connecting part is strong enough to bear circumferential force generated by normal operation of the steering wheel and acting thereon owing to engagement of respective cross-sectionally rectangular parts of the upper shaft 10 and connecting member 11 which are in fitting relation with each other, however, it has no more strength than that equivalent to shear strength of resin poured as above against force axially acting thereon, and, when an extremely large axial impact acts upon the upper shaft 10 to cause shearing breakage in the lump of resin, the upper shaft 10 can axially move in the connecting member 11.

The housing 2 comprises an upper shaft housing 20 in the shape of a thin-wall cylinder for supporting the upper shaft 10 therewithin, a lower shaft housing 23 for supporting the lower shaft 12 therewithin, and a connecting member housing 21 surrounding the connecting member 11 and connecting the former two housings together on the same axial line. Between the upper shaft housing 20 and the connecting member housing 21, a thin-wall cylindrical ball-retentive member 22 for retaining a plurality of small balls 22a, at each of two points spaced at an appropriate distance is interposed, and small balls 22a, 22a, . . . are in engagement with the lower inner surface of the upper shaft housing 20 and also with the upper outer surface of the connecting member housing 21 so that, when the lump of resin is sheared to breakage and the upper shaft 10 is displaced, impact causing the breakage may be absorbed by resistance to sliding caused among the small balls 22a, 22a, . . . and the upper shaft housing 20 and the connecting member housing 21.

The lower shaft 12 comprises an input shaft 12a and output shaft 12b each having a hollow part at the axial center, in which the input shaft 12a is supported by the ball bearing 24 in the lower shaft housing 23 whereas the output shaft 12b is supported by the ball bearings 25 and 26 at two points spaced at an appropriate axial distance in the lower shaft housing 23 and is disposed lower than the input shaft 12a. A torsion bar 3, which is as long as an approximate sum of lengths of hollow parts of the input shaft 12a and output one 12b, small in diameter at the central portion, and equally round in section, is inserted through the abovesaid hollow parts of the two shafts and both ends thereof are fixed with dowels 3a, 3b piercing through the input shaft 12a and output one 12b in the radial direction to the respective vicinities of the upper end of the input shaft 12a and the lower end of the output shaft 12b. The lower part of the connecting member 11 is fitted on the upper part of the input shaft 12a and fixed, together with the torsion bar 3, by the dowel 3a and the input shaft 12a is turned with the turn of the upper shaft 10, that is, turn of the steering wheel 1a, through the connecting member 11. The lower end of the output shaft 12b projecting from the lower part of the lower shaft housing 23 in an appropriate length is, as described earlier, connected to the pinion shaft 62 through the universal joint 13 and intermediate shaft 14, whereby steering corresponding to the turing direction and the degree of turning of the output shaft 12b is performed through the action of the motion-converting mechanism 6.

When steering torque acts upon the upper shaft 10 with the turning operation of the steering wheel 1a to which the upper shaft 10 is connected, the input shaft 12a to move in association with the upper shaft 10 tends to turn correspondingly thereto and, on the other hand, the displacement of the rack shaft 61 in the motion-converting mechanism 6 is restrained by resistance of the road surface acting against the front wheels and turning of the output shaft 12b connected to the pinion shaft 62 engaging with the rack shaft 61 is restrained, whereby torsion corresponding to the direction and magnitude of steering torque is generated in the torsion bar 3 connecting both shafts, and the input shaft 12a and output one 12b perform circumferential relative displacement correspondingly to this torsion. A torque sensor 4 for sensing such steering torque is composed of: a potentiometer whose output potential varies correspondingly to the abovesaid displacement and which is disposed on a sleeve 40 movably fitted on the lower part of the input shaft 12a; a resistor-retentive member 41 thrusted into the outer space of the sleeve 40, fixed thereto, and restrained from turning, together with the sleeve 40, by the input shaft 12a because of engagement a pin 41a; and a sensor-retentive member 42 which is rotatably fitted at the upper half thereof on the lower part of the sleeve 40, movably fitted at the lower half thereof onto the upper part of the output shaft 12b, and restrained from turning by the output shaft 12b because of engagement with the pin 42a. The bottom surface of the resistor-retentive member 41 and the top surface of the sensor-retentive member 42 perpendicularly intersect the axis of the lower shaft 12 respectively and adapted to face each other with a certain width of gap interposed therebetween in the axial direction. The former is provided with a resistor 43 formed to be a part of a circular ring having an appropriate radial width around the axis thereof whereas the latter with a projecting sensor 44 to be in contact with the resistor 43. In FIG. 5, two sensors 44 are shown, however, one is a backup in a cases of breakage of the other. The upper part of the resistor-retentive member 41 is in the shape of a thin-wall cylinder as shown in the drawing and provided with a plurality of slip rings 45, around the outer periphery thereof, each of slip rings 45, being in slide-contact with corresponding one of brushes 46, formed to project from a terminal box 47 fixed to the lower shaft housing 23 toward the inside of the housing 23. Both ends of the resistor 43 are respectively connected to an external power source and grouping line which are not shown through slip rings 45 connected thereto, brushes 46 in slide-contact with the slip rings, and a terminal box 47, the resistor 43 being impressed with a certain amount of input potential. Output potential of the torque sensor obtained as potential corresponding to a position of slide-contact of the sensor 44 to the resistor 43 is externally taken out through the slip rings 45 connected to the sensor 44 through a preamplifier incorporated, but not shown, in the resistor-retentive member 41 as well as through the brushes 46 in slide-contact with the slip rings 45 and, further, through the terminal box 47, and is inputted into the input side of a control part 7.

At the middle of the axial length of the output shaft 12b, a worm wheel 50 for driving rotational power of the steering-assisting motor 5 to this shaft is fitted thereon. The worm wheel 50 is positioned while retained from both sides in the axial direction by the ball bearing 25 supporting the upper part of the output shaft 12b and another ball bearing 26 supporting the lower part of the output shaft 12b, and the worm wheel 50 is restrained from rotating by the output shaft 12b on account of a semicircular key 50a inserted between the worm wheel and the output shaft 12b. A worm wheel shaft 51 connected to and associatively operated by the steering-assisting motor 5 is meshed with the outer periphery of the worm wheel 50 in such manner that the worm shaft perpendicularly intersect the worm wheel.

Figure 6:
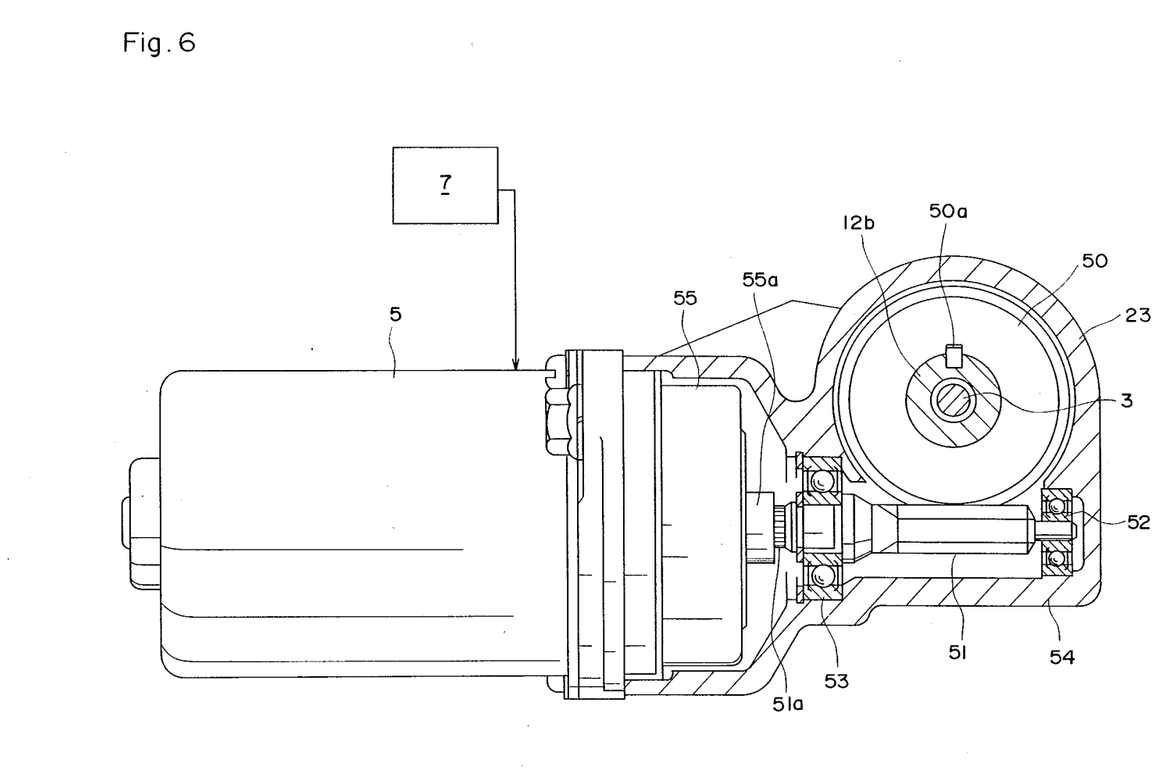
FIG. 6 is an enlarged sectional view taken from the line VI—VI shown in FIG. 5 for showing the structure of a driving mechanism of the motor.

FIG. 6 is an enlarged sectional view taken along the line VI—VI in FIG. 5 showing the driving mechanism of the motor 5. As shown in this drawing, a bottomed cylindrical worm shaft housing 54 provided with a diametrically large opening on one side and internally reduced in diameter is provided outside the lower shaft housing 23 in such a way as approximately intersecting the lower shaft housing 23. The worm shaft 51 having worm teeth on the middle part of the axial length thereof meshed with the outer periphery of the worm wheel 50 mounted in the lower shaft housing 23 as described before is rotatably disposed in the worm shaft housing 54 while supported by the ball bearing 52, 53 at both sides of meshing position and the motor 5 is fixed to the worm shaft housing 54 in a way that an electromagnetic clutch 55 coaxially mounted on the rotational axis of the motor 5 is disposed on the inner side and partly fitted in the abovesaid opening. A spline 51a is formed on a part of the outer periphery surface outwardly projecting from the point supported by the ball bearing 53 on the worm shaft 51, whereby the worm shaft 51 and the motor 5 are connected to each other with the spline 51a engaged with the output shaft 55a inwardly projecting at the axial center of the electromagnetic clutch 55a. The motor 5 is connected to the output side of the control part 7 through a drive circuit not shown and driven in the right or reverses direction in response to drive signals from the control part.

In this way, in the power steering apparatus of this invention, a torque sensor 4, worm wheel 50 as power driving means, and worm shaft 51 are contained in the housing 2 surrounding the steering shaft, and the motor 5 is mounted on the outside of the housing 2, whereby the torque sensor 4 and the motor 5 can be installed compactly around the steering shaft in the cab.

In the power steering apparatus of the structure as described above according to this invention, when the steering wheel 1a is operated by the driver to steer right or left, steering torque generated in the upper shaft 10 by the steering power is driven to the input shaft 12a through the connecting member 11 and torsion corresponding to this steering torque is caused in the torsion bar 3 between the input shaft 12a and the output shaft 12b subjected to restraining force from the motion-converting mechanism 6. The torque sensor 4 composed as described above between the input shaft 12a and output one 12b outputs potential corresponding to the circumferential relative positions of the input shaft 12a and the output one 12b toward the control part 7, which, from variation in potential inputted from the torque sensor 4, recognizes the direction of relative displacement caused by torsion of the torsion bar 3 between the input shaft 12a and the output one 12b, that is, the acting direction of operating force exerted on the steering wheel 1a, and upon recognition as above, emits drive signals for rotation in the right or left direction corresponding to the recognized direction toward the motor 5. Rotational power of the motor 5 driven in the right or reverse direction is driven to the output shaft 12b through the electromagnetic clutch 55, worm shaft 51, and worm wheel 50, and, further, to the pinion shaft 62 through the intermediate shaft 14. Revolutions of the pinion shaft 62 are converted into axial displacement of the rack shaft 61 on account of meshing of the pinion teeth 62 with the rack teeth 61a and the front wheels connected to both ends of the rack shaft 61 are steered right or left with displacement of the rack shaft 61.

The restraining force acting on the rack shaft 61 at the time of steering increases with the increases in steering angle of the front wheels and, in the power steering apparatus of this invention, because of the rack teeth 61a formed in the manner as described before and the displacement R of the rack shaft 61 per revolution of the pinion shaft 62 varying as shown in FIG. 4, the number of revolutions of the motor 5 corresponding to unit displacement of the rack shaft 62a increases as the point of meshing of the pinion teeth 62a with the rack teeth 61a approaches both ends of the zone within which the rack teeth 61a are formed, and, when the rotational power generated by the motor 5 is constant, displacement power of the rack shaft 61, namely, steering-assisting power increases with the increase in displacement of the rack shaft 61 from the initial set position, that is, the increase in the steering angle of the front wheels. In other words, at the time of low speed running or halt of the car during which steering operation of a comparatively large angle is performed, steering-assisting power is generated larger than that generated when steering operation of a small angle is performed at the time of high speed running, whereby a motor 5 of large capacity corresponding to a large steering-assisting power required for low speed running or halt is not needed, compacting of the motor 5 is enabled, and appropriate stiffness can be furnished to the steering wheel 1a at the time of high speed running to ensure stability in driving.

Figure 7:
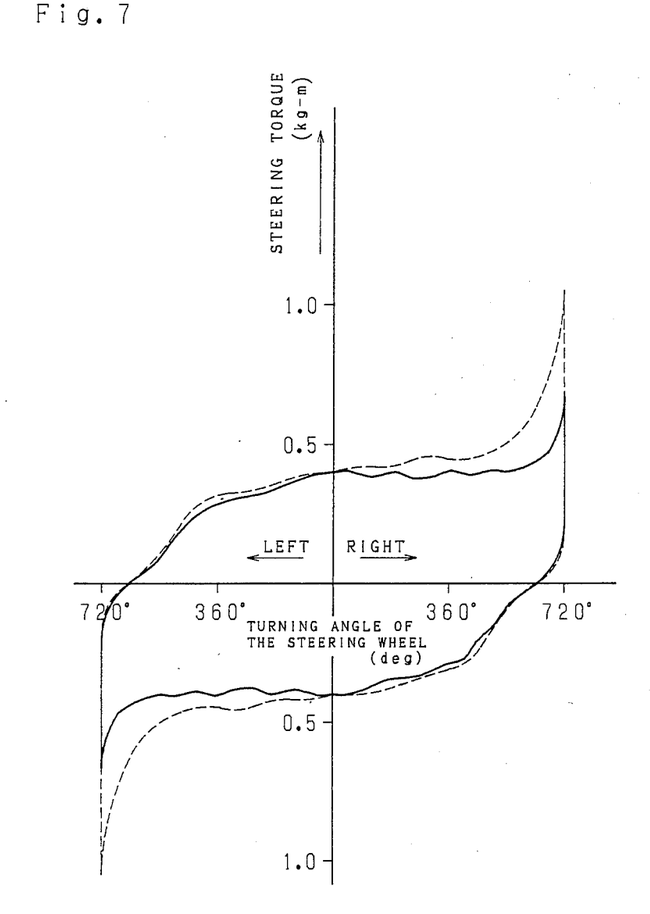
FIG. 7 is a graph showing steering power reduction effects of a power steering apparatus of this invention.

FIG. 7 is a graph showing amounts of power required for operating the steering wheel 1a during a halt of the car and compared between a power steering apparatus of this invention and the conventional apparatus equipped with a motor of the same capacity as that used in this invention with pressure angles of the rack teeth 61a being constant throughout the zone in which the rack teeth 61a are formed, and in the drawing the amount of power in the case of the power steering apparatus of this invention is shown by the continuous line whereas that of the conventional apparatus by the broken line. As shown in this graph, power reduction effects in steering operation by the power steering apparatus of this invention is apparently superior to, particularly, in the case of a large angle operation of the steering wheel 1a, those by the conventional apparatus, thereby enabling turning operation of the steering wheel 1a at an approximate constant rate of power almost throughout the zone of operability of the steering wheel 1a.

In this embodiment, some parts with the pressure angle of the rack teeth 61a being constant are provided near the center and both ends of the zone within which rack teeth 61a are formed, the part of a constant pressure angle near the center of the zone is provided for the purpose of enabling proportional relation between the turning angle of the steering wheel 1a and the steering angle of the front wheels during approximately straight running whereas the parts near both ends are for informing the driver of the close proximity to the allowable turning limit with a small degree of tightness in operating the steering wheel 1a, however, it is a matter of course that rack teeth 61a may be formed in such manner that the pressure angle is reduced while starting from a point C shown in FIG. 3 to the right and left ends without the formation of parts of constant pressure angle.

As has been described in detail, in the power steering apparatus of this invention, the torque sensor driving device are contained in the housing surrounding the steering shaft and a motor for assisting steering is disposed outside the housing, whereby it is possible to compactly arrange the torque sensor and motor around the steering shaft positioned in the cab, repair and adjustment of the torque sensor and motor that have hitherto been difficult can be easily performed in a wide space of the cab or outside the cab, if required, with the steering shaft removed together with the housing. Further, as shown in the embodiment, when the driving device is composed of the worm wheel mounted on the steering shaft and the worm shaft engaging with the outer periphery of the worm wheel, a point of engagement can appropriately be set on the periphery of the worm wheel and the motor can be fixed on an appropriate point along the peripheral direction of the housing, thereby positioning of the motor in the inner space of the cab being enabled. A power steering apparatus of this invention can compactly be made at the lower part of the steering shaft and is applicable to a shaft system of the structure of safe steering wheel as shown in the embodiment. Since pressure angles of the rack teeth on the rack shaft at the position of meshing thereof with the pinion teeth formed on the pinion shaft reduce with the advance to the ends of the rack teeth formation zone, force of movement imparted to the rack shaft, that is, steering-assisting force, increases with the increase in turning angle of the steering wheel from that at the time of straight running of the car, whereby steering with a constant intensity of operating force throughout the zone of turning angle of the steering wheel, sufficient intensity of steering-assisting force at the time of low speed running or halt can be obtained, an appropriate stiffness can be endowed to the steering wheel at the time of high speed running, and running stability can be improved, and also such characteristic performance is enabled by a motor of small capacity without control over electric driving power fed to the motor.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A power steering apparatus, in which a steering shaft is connected at one end to a steering wheel disposed in the cab of a car, said steering shaft is connected at an opposite end to one side of a universal joint, the other side of said universal joint is connected to a pinion shaft disposed outside the cab, a rack-pinion type steering mechanism is provided for steering in such a way that the rotation of said pinion shaft caused by the turning operation of the steering wheel is converted into the transverse movement of a rack shaft engaging with said pinion shaft, a steering assisting motor driven on the basis of sensed steering torque exerted on said steering wheel, a torque sensor means disposed on a middle part of said steering shaft between said steering wheel and said pinion shaft for sensing said steering torque, a driving means disposed between said torque sensor means and said mechanism adjacent to said torque sensor for transmitting the rotation of said motor to said steering shaft, and a housing enclosing at least a portion of said steering shaft containing said driving means and torque sensor means therewithin and having said motor attached to the outside thereof, said rack shaft having a plurality of teeth formed along the axial direction of said rack shaft, each of said rack teeth provided with pinion shaft engaging pressure angles, such pressure angles reduce in magnitude with the advance from the middle part of the rack shaft outwardly toward the ends of the rack shaft, said rack shaft engaging pinion teeth on the outer periphery of the pinion shaft, said steering shaft having input and output sides with the input side extending to said steering wheel and said output side extending to said pinion shaft, said driving means including a worm wheel fixedly attached to said output side of said steering shaft and a worm gear associated with said motor and being rotatable upon activation of said motor, said worm gear engaging said worm wheel, said driving means further including a clutch means operatively associated with the motor and positioned between said motor and said worm gear for selectively transmitting the rotational power of said motor to the worm gear, said worm gear includes teeth and has a tip end portion with a diameter which is smaller than the diameter of the gear at the bottom of its said teeth, said tip end and an opposite end of said worm gear being supported by said housing, said opposite end of the worm gear being located at an opening of said housing, said clutch means being mounted within said housing opening.

2. A power steering apparatus as set forth in claim 1, wherein said torque sensor means includes a potentiometer, said potentiometer includes a sleeve carried by said steering shaft input side adjacent said steering shaft output side, a resistor retentive member carried by said sleeve, said sleeve and said resistor retentive member being rotatable with said steering shaft input side, a sensor retentive member fitted on said steering shaft output side spacedly adjacent said resistor retentive member and being rotatable with said steering shaft output side, wherein relative torsional movement between said steering shaft input side and output side is sensed by said potentiometer.

* * * * *